United States Patent [19]

Brandly

[11] 4,384,221
[45] May 17, 1983

[54] MOTOR

[76] Inventor: Ernest B. Brandly, 900 S. A, Suite 314, Richmond, Ind. 47374

[21] Appl. No.: 245,264

[22] Filed: Mar. 19, 1981

[51] Int. Cl.³ .............................................. H02K 41/00
[52] U.S. Cl. ........................................ 310/24; 310/35; 310/27
[58] Field of Search ...................... 310/27, 32, 37, 21, 310/22, 23, 24, 34, 35

[56] References Cited

U.S. PATENT DOCUMENTS

| 883,276 | 3/1908 | Beard | 310/27 |
| 3,967,146 | 6/1976 | Howard | 310/24 |

Primary Examiner—Donovan F. Duggan
Assistant Examiner—Anita Ault
Attorney, Agent, or Firm—Barnes & Thornburg

[57] ABSTRACT

A motor includes two reciprocating electromagnets. The magnets are energized at positions when the total repulsive forces of the electromagnets can be applied to a single crankshaft. The electromagnets are energized when the crankshaft is 90° past top dead center, in a position to provide maximum torque. One of the electromagnets is positioned by a groove follower which rides in a cam groove cut in a face of a camshaft. The camshaft is connected by a connecting linkage to the crankshaft to follow it. The cam moves the second electromagnet such that the air gap between the two electromagnets is reduced to zero when the first electromagnet is 90° past top dead center.

7 Claims, 8 Drawing Figures

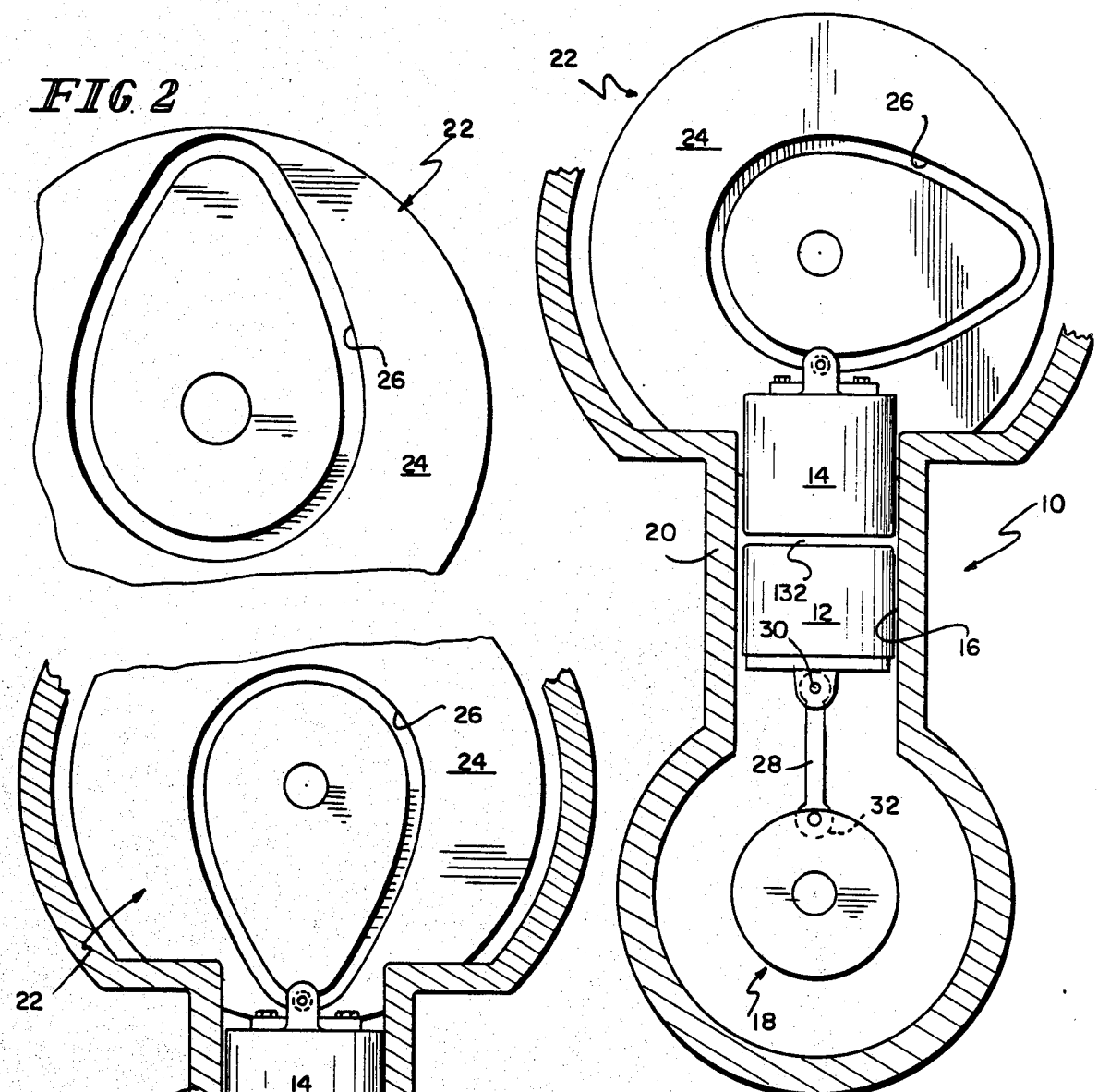
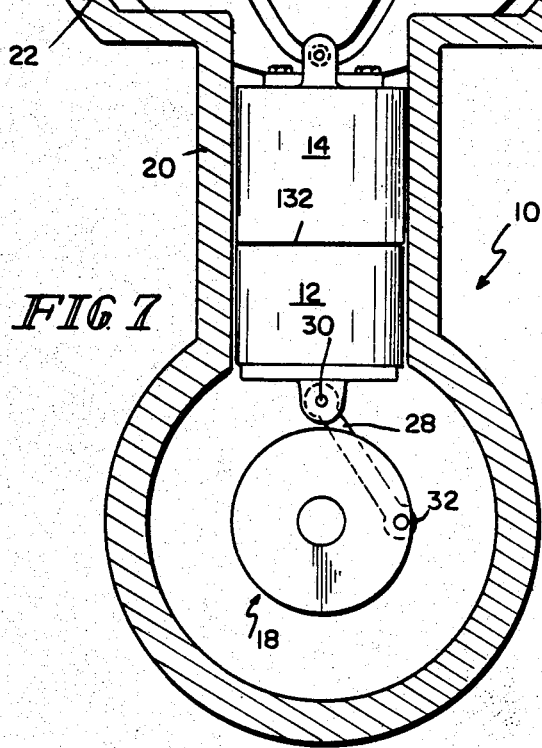
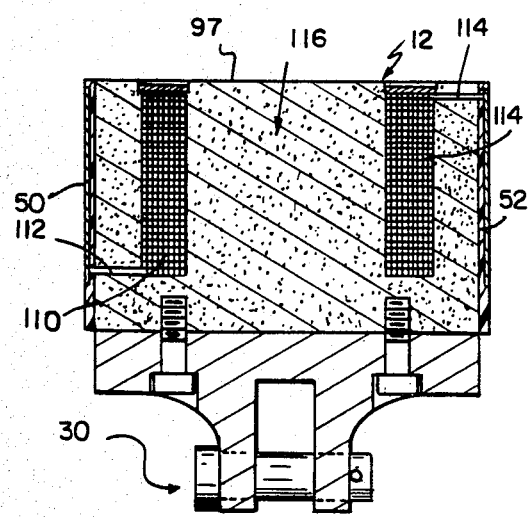

MOTOR

This invention relates to electric motors, and specifically to an electric motor which utilizes reciprocating electromagnets, so that repulsion between the two magnets can be controlled in a timed manner.

According to the invention, an electric motor includes first and second electromagnets and means for relatively reciprocably mounting the electromagnets for movement relatively toward and away from each other. The mounting means includes a first shaft. Switching means switches a supply of electric power to the electromagnets such that current flows in the electromagnets so that they are repelled away from each other as they reach their smallest spacing.

According to an illustrative embodiment, the first shaft is a first crankshaft, and the mounting means further includes a first connecting rod and a first pin for coupling the first electromagnet to the first crankshaft. The mounting means further includes a second crankshaft, a second connecting rod, and a second pin for coupling the second electromagnet to the second crankshaft. Means are provided for coupling the second crankshaft to the first to provide synchronous motion of the first and second electromagnets. Illustratively, the mounting means further includes a cylinder for reciprocably mounting the first and second electromagnets.

Further according to the illustrative embodiment, the switching means includes terminals provided on the cylinder wall adjacent the first and second electromagnets and terminals on the first and second electromagnets, with the spacing of the terminals on the electromagnets and cylinder wall being such that, as the first and second electromagnets approach their smallest spacing, the current in the electromagnets flows in a direction to establish a field to repel each other.

The invention may best be understood by referring to the following description and accompanying drawings which illustrate the invention. In the drawings:

FIG. 2 is a detail of the apparatus of FIG. 1, including a cam groove profile;

FIG. 6 is a vertical sectional view, taken transversely of the axis of the motor shaft, showing the motor at a point during its operation;

FIG. 7 is a vertical sectional view, taken transversely of the axis of the motor shaft, showing the motor at a subsequent point during its operation; and, FIG. 8 is a cross section through the axis of an illustrative electromagnet structure.

Figures 1, 3, 4, 5:
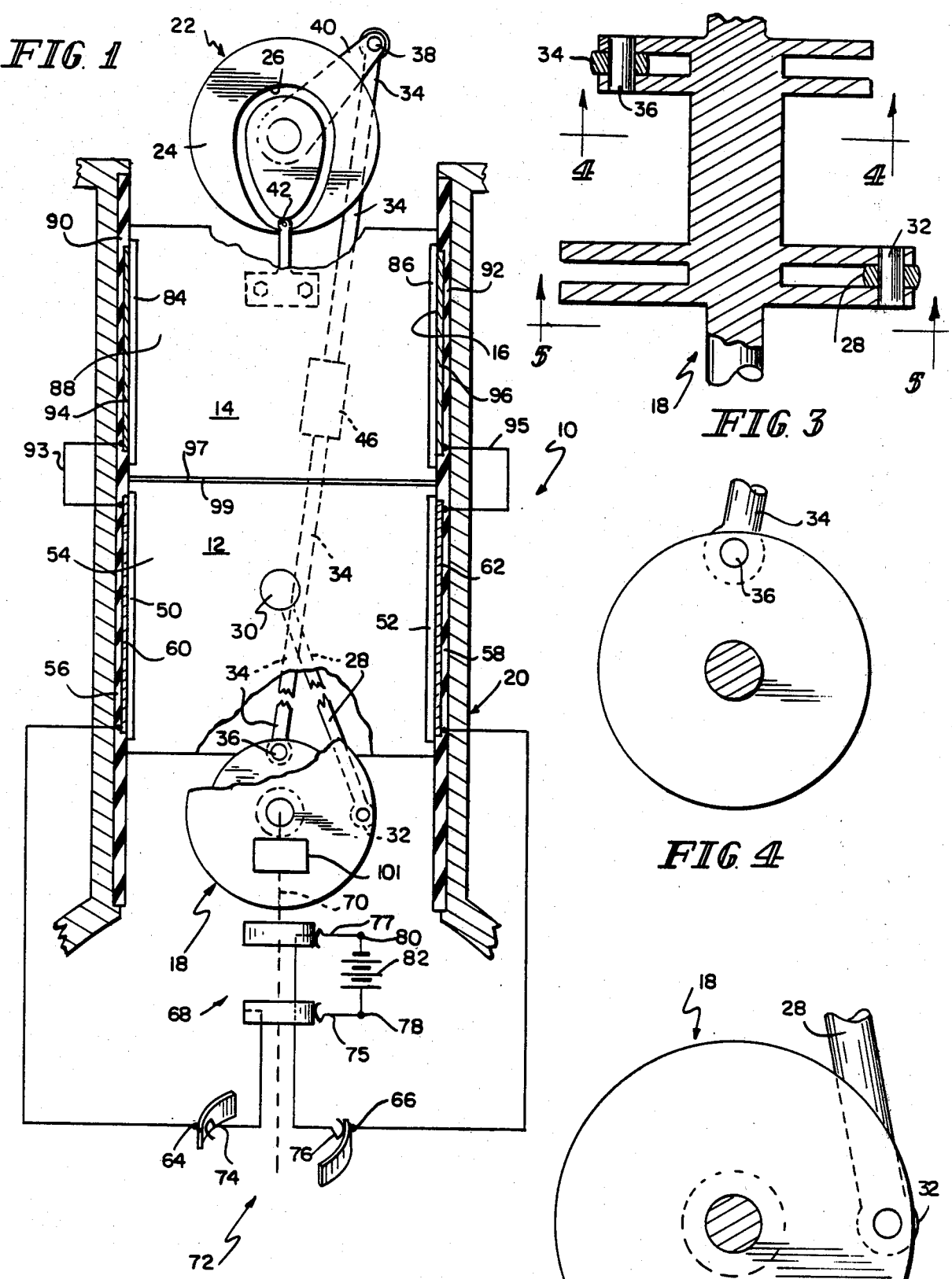
FIG. 1 is a partly fragmentary and diagrammatic end elevational view of a motor constructed according to the present invention.
FIG. 3 is a side elevational view of the detail of the assembly of FIG. 1.
FIG. 4 is a sectional view of the detail of FIG. 3, taken generally along section lines 4—4 thereof.
FIG. 5 is a sectional view of the detail of FIG. 3, taken generally along section lines 5—5 thereof.

Turning now to FIG. 1, an electric motor 10 includes a first electromagnet 12 and a second electromagnet 14, both reciprocably mounted in a cylinder 16 for movement toward and away from one another. A crankshaft 18 is rotatably mounted in the motor 10 housing 20 beneath electromagnet 12. A crankshaft 22 is also mounted in housing 20 above electromagnet 14. Crankshaft 22 includes an axially facing surface 24 into which is cut a cam groove 26. A connecting rod 28 is coupled by a pin 30 to electromagnet 12. Connecting rod 28 is coupled at its other end 32 pivotally to crankshaft 18. The detail of crankshaft 18 is as best illustrated in FIGS. 3-5. A connecting rod 34 is pivotally coupled at 36 to crankshaft 18, and is pivotally coupled at 38 to a crank arm 40 provided on crankshaft 22. A roller cam groove follower 42 is provided on the second electromagnet 14. The roller of follower 42 engages the cam groove 26 provided in surface 24 of crankshaft 22 to control the movement of electromagnet 14. A shock absorber 46 is provided about midway along the length of connecting rod 34 to assist in damping of motor-operating shock.

A number of different timing mechanisms can be used to achieve the magnetic field necessary to obtain repulsive forces between magnets 12 and 14. In a first one of these, illustrated diagrammatically in FIG. 1, contact strips 50, 52 are provided on the side wall 54 of electromagnet 12. It must be remembered that both of electromagnets 12, 14 are constructed from many turns of wire surrounding ferromagnetic cores, and that the turns of wire are insulated so that there is no shorting among the various turns or between the turns and the core or between the turns and the cylinder 16 wall. The contact strips 50, 52 are insulated from one another by the material surrounding them on side wall 54 and by electrically insulative portions 56, 58 of the cylinder 16 wall. Within insulative portions 56, 58 are contact strips 60, 62, respectively, which engage contact strips 50, 52, respectively. Contact strips 50, 52 are coupled to opposite ends of the many turns of wire of electromagnet 12. Contact strips 60, 62 are coupled to output terminals 64, 66 of a distributor 68, the shaft 70 of which is driven from crankshaft 18. The rotor 72 of distributor 68 varies contacts 74, 76 which are insulated from one another, and which are coupled by brushes 75, 77, respectively, to the positive and negative terminals 78, 80, respectively, of a battery 82. Therefore, as distributor rotor 72 is rotated by crankshaft 18, contact strips 50, 52 are switched alternatively positive and negative with respect to each other. The second electromagnet 14 is provided with similar insulated contact strips 84, 86 in its side wall 88. Insulative portions 90, 92 of cylinder 16 wall surrounding contact strips 84, 86 insulate these contact strips from one another and from the cylinder wall. Insulative portions 90, 92 include contact strips 94, 96 which engage contact strips 84, 86, respectively. Contact strips 94, 96 are also coupled to output terminals 64, 66 of distributor 68 by way of contact strips 60, 62 and conductors 93, 95. Therefore, the field supplied to electromagnet 14 varies in a manner identical to the field supplied to electromagnet 12. In this way, the adjacent faces 97, 99 of electromagnets 12, 14 are alternately switched in successive engine operation cycles to reverse all north magnetic poles to the south and all south magnetic poles to the north. Repulsion, of course, results. The terminals 64, 66 are so positioned and configured as to cause current to flow in electromagnets 12, 14 for a brief interval after electromagnet 12 reaches 90° past top dead center and the spacing 132 between faces 97, 99 reaches a minimum zero air gap. Application of the repulsive forces of electromagnets 12, 14 to the crankshaft 18 with the crankshaft 18 in this position (90° past top dead center) insures the application of maximum torque to the crankshaft and therefore to the motor system.

To minimize the possibility that any residual magnetism of electromagnets 12, 14 will deleteriously affect motor 10 performance, distributor 68 is driven from crankshaft 18 through a 2:1 speed-reducing transmission 101 illustrated diagrammatically. This causes the adjacent faces 97, 99 of electromagnets 12, 14 to be the same magnetic pole in one cycle of motor 10 operation and then the opposite magnetic pole in the next successive cycle of motor 10 operation. This is achieved by the alteration of the direction of current flow through the windings of electromagnets 12, 14 during such successive cycles.

FIG. 8 illustrates a cross-section of electromagnet 12. In the cross-section, the windings 110 are visible, as are the contact strips 50, 52 to which the ends 112, 114, respectively, of the windings 110 are connected. Windings 110 surround a ferromagnetic core 116 of soft iron or the like, which is readily magnetizable, but has very little residual magnetism. This feature enhances the establishment of a field first in one direction and then in the other during successive cycles of motor 10 operation. The entire assembly of windings 110, core 116, and contact strips 50, 52 has a shape similar to that of a conventional internal combustion engine piston.

What is claimed is:

1. An electric motor comprising first and second electromagnets, means for relatively reciprocably mounting the electromagnets for movement relatively toward and away from each other, the mounting means including a first crankshaft, means for coupling the first crankshaft to the first electromagnet, rotation of the first crankshaft accompanying reciprocation of the first electromagnet, and means for switching a supply of electric power to the electromagnets, the switching means causing current to flow in the electromagnets such that they are repelled away from each other as they reach their smallest spacing and as the first crankshaft reaches approximately 90° past top dead center of the positioning of the first electromagnet.

2. An electric motor comprising first and second electromagnets, means for relatively reciprocably mounting the electromagnets for movement relatively toward and away from each other, the mounting means including a first crankshaft, and means for switching a supply of electric power to the electromagnets, the switching means causing current to flow in the electromagnets such that they are repelled away from each other as they reach their smallest spacing, the mounting means further including a first connecting rod and a first pin for coupling the first electromagnet to the first crankshaft, a second crankshaft, a second connecting rod and a second pin for coupling the second electromagnet to the second crankshaft, and means for coupling the second crankshaft to the first to provide synchronous motion of the first and second electromagnets.

3. The motor of claim 2 wherein the mounting means further includes a cylinder for reciprocably mounting the first and second electromagnets.

4. The motor of claim 3 wherein the switching means includes means providing terminals on the cylinder wall adjacent the first and second electromagnets and terminals on the first and second electromagnets, a distributor, and means for coupling the distributor to the terminals on the cylinder wall such that, as the first and second electromagnets approach their smallest spacing, currents flow in the electromagnets to establish in them fields causing the electromagnets to be repelled by each other.

5. The motor of claim 2 wherein the switching means includes a distributor for controlling the flow of current in the first and second electromagnets such that, as the electromagnets approach their smallest spacing, current flows in the first and second electromagnets to establish fields in them to repel each other during one cycle of motor operation, and during the next successive cycle of motor operation, as the first and second electromagnets approach their smallest spacing, current flows in them in the opposite direction to the current flow in the preceding cycle to establish fields in them to repel each other.

6. The motor of claim 2 wherein the smallest spacing is a zero spacing in which the first and second electromagnets lie against each other.

7. The motor of claim 4 wherein the smallest spacing is a zero spacing in which the first and second electromagnets lie against each other.

* * * * *